United States Patent [19]
Scherenberg

[11] Patent Number: 5,007,402
[45] Date of Patent: Apr. 16, 1991

[54] INTAKE SYSTEM FOR A MIXTURE-COMPRESSING INTERNAL-COMBUSTION ENGINE

[75] Inventor: Dieter Scherenberg, Stuttgart, Fed. Rep. of Germany

[73] Assignee: Daimler-Benz AG, Fed. Rep. of Germany

[21] Appl. No.: 544,833

[22] Filed: Jun. 28, 1990

[30] Foreign Application Priority Data

Jul. 1, 1989 [DE] Fed. Rep. of Germany ....... 3921739

[51] Int. Cl.⁵ .............................................. F02M 31/00
[52] U.S. Cl. ..................................... 123/549; 123/547
[58] Field of Search ............... 123/549, 557, 543, 546, 123/547

[56] References Cited

U.S. PATENT DOCUMENTS

| | | | |
|---|---|---|---|
| 3,760,780 | 9/1983 | Jordan | 123/549 |
| 3,930,477 | 1/1976 | Jordan | 123/549 |
| 4,141,327 | 2/1979 | Marcoux et al. | 123/549 |
| 4,345,569 | 8/1982 | Hattori et al. | 123/549 |
| 4,458,654 | 7/1984 | Tuckey | 123/549 |
| 4,550,699 | 11/1985 | Okumura et al. | |

Primary Examiner—Andrew M. Dolinar
Assistant Examiner—M. Macy
Attorney, Agent, or Firm—Evenson, Wands, Edwards, Lehanan & McKeown

[57] ABSTRACT

The invention relates to an intake system for a mixture-compressing internal-combustion engine, having a heating element of flat form which is arranged in the intake channel downstream of a fuel-injection nozzle. The heating element is intended for heating the fuel/air mixture and which, above a specific cooling-water temperature, can be transferred from a working position extending transversely relative to the direction of flow into a position of rest lying in the direction of flow. The invention also relates to the method of the heating element position and electrical controlling heating status.

12 Claims, 1 Drawing Sheet

INTAKE SYSTEM FOR A MIXTURE-COMPRESSING INTERNAL-COMBUSTION ENGINE

BACKGROUND AND SUMMARY OF THE INVENTION

The invention relates to an intake system for a mixture-compressing internal-combustion engine of the type having an electrically heatable heating element of flat form which is arranged in the intake channel downstream of a fuel-injection nozzle and transversely relative to the direction of flow and which is intended for heating the fuel/air mixture.

As is known, arranging a heating element downstream of a fuel-injection nozzle spraying into the intake channel affords an improvement of the mixture formation with the intake air flowing past and a reduction of the HC and CO emission. An intake system of this type is described in Japanese Abstracts 55-15 11 51 (Application No. 54-58, 541). In this system the fuel spread out by the fuel-injection nozzle is guided through the heating element effective at low cooling-water temperature and evaporates. The evaporated fuel is admixed with the combustion air flowing past in the intake channel and is thus fed as a heated fuel/air mixture to the corresponding combustion space in the cylinder.

An object on which the invention is based, starting from the above-mentioned intake system, is to obtain an improvement of power in the full-load mode by means of further measures.

This object is achieved according to the invention by providing an arrangement wherein the heating element is made rotatable in such a way that, above a specific engine cooling-water temperature, it can be transferred from its transverse working position into a position of rest lying in the direction of flow.

As a result of the rotatable mounting of the heating element which needs to perform its function only at specific low cooling-water temperatures, the position in the direction of flow causes no pressure losses in the intake channel and therefore also no power losses under full load.

Other objects, advantages and novel features of the present invention will become apparent from the following detailed description of the invention when considered in conjunction with the accompanying drawings.

DETAILED DESCRIPTION OF THE DRAWINGS

In the intake channel 1 of a mixture-compressing internal-combustion engine with four valves per cylinder, there is arranged between the inlet valves 2, 3 and a fuel-injection valve 4 an electrical heating element 5 which is mounted rotatably as a flat grid-shaped or honeycombed body. The heating element 5 consists of an electrical resistance material with a positive resistance-temperature coefficient, the heating capacity of which is controllable as a function of operating parameters of the internal-combustion engine, such as the speed, load and/or cooling-water temperature.

Figure 1:
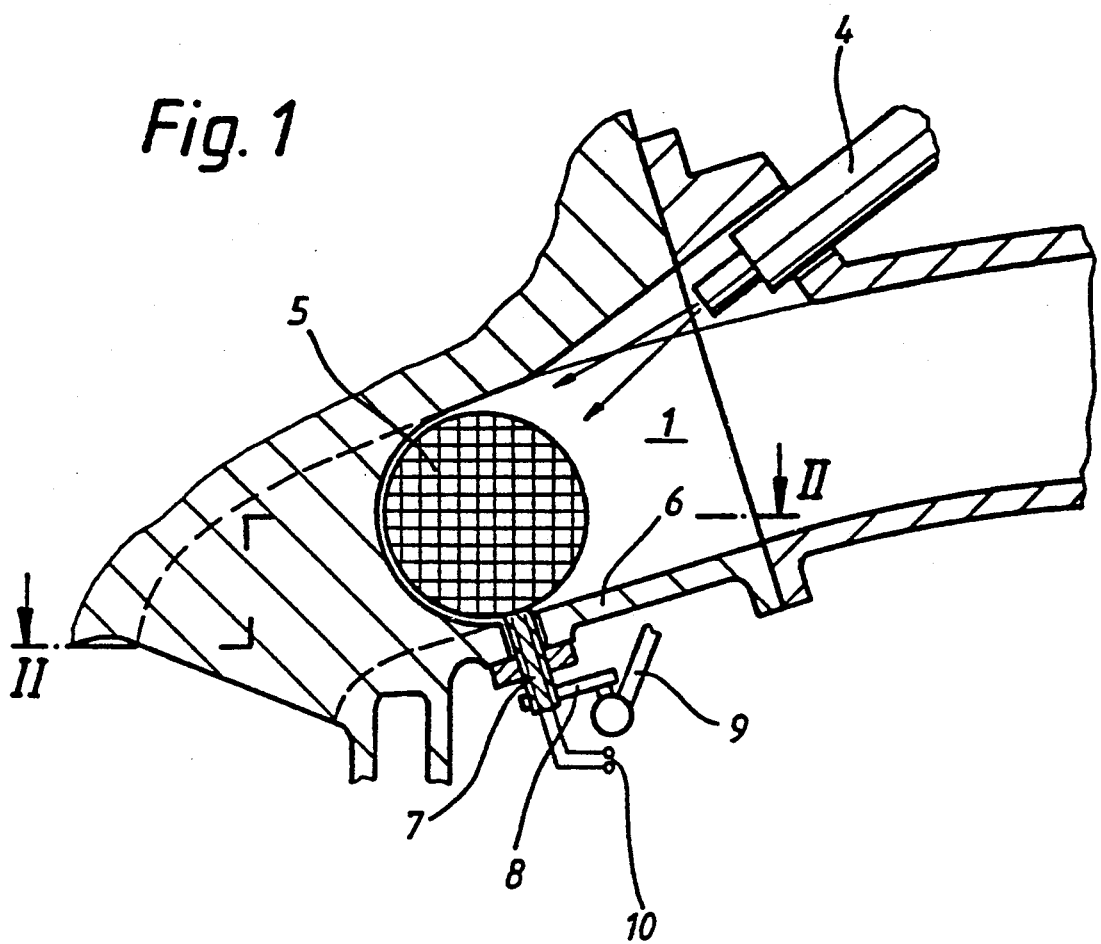
FIG. 1 shows a section through the intake channel with a heating element, constructed according to a preferred embodiment of the invention.
Figure 2:
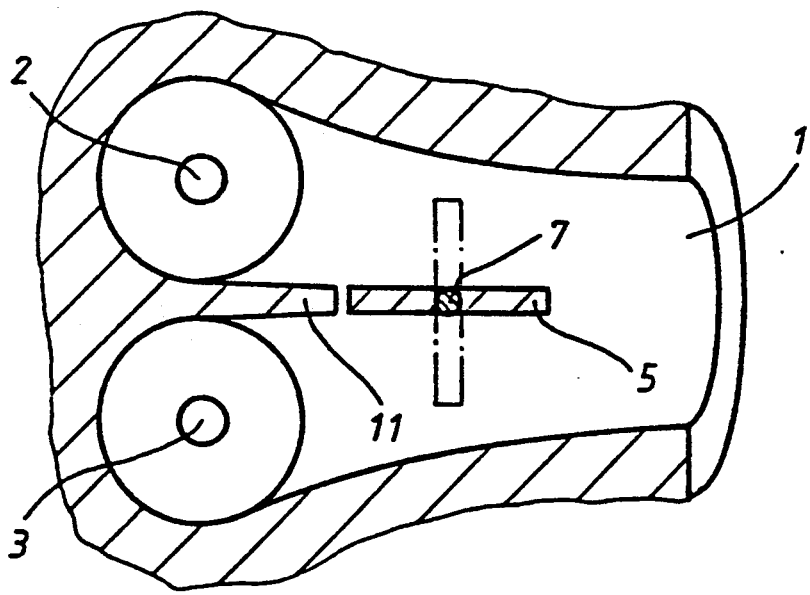
FIG. 2 shows a section through the intake channel along the line II—II in FIG. 1.

The heating element 5 is mounted on one side, specifically by means of a heating-element shaft 7 which is guided in the wall 6 of the intake channel 1 and which, at its outer free end, is connected firmly to a crank-like actuating lever 8, on which is articulated an adjusting rod 9 connecting a plurality of actuating levers in a cylinder bank. The adjusting rod 9 can be actuated or adjusted pneumatically via a diaphragm cell, electromagnetically, electromotively or hydraulically. The electrical contacting 10 takes place via the shaft 7. Below a specific cooling-water temperature, the heating element 5 is transversely in the flow path of the intake channel 1 and is heated (see the position represented by dot-and-dash lines in FIG. 2). In this position, the heating element 5 is wetted by the fuel jets and subjected completely to the air flow. When a specific upper cooling-water temperature is exceeded, the heating element 5 is rotated in the direction of flow of the mixture and is unheated (FIGS. 1 and 2).

The arrangement of the heating element 5 and its mounting in the intake channel 1 are such that the heating element 5, when in a position of non-use or the position of rest, constitutes a prolongation of a partition wall 11 extending between the inlet valves 2, 3 and projecting into the intake channel 1. The angle of adjustment of the heating element 5 can be controlled as a function of the load and speed, and the heating capacity can be obtained as a function of the angle of adjustment and the cooling-water temperature. By influencing the angle of adjustment of the heating element 5 in this way, the best possible mixture formation over the entire operating range of the internal-combustion engine is obtained.

The functions of the heating element 5 are also performed when two injection valves per cylinder are used.

Although the invention has been described and illustrated in detail, it is to be clearly understood that the same is by way of illustration and example, and is not to be taken by way of limitation. The spirit and scope of the present invention are to be limited only by the terms of the appended claims

What is claimed:

1. Intake system for a mixture-compressing internal combustion engine, having an electrically heatable heating element of flat form which is arranged in the intake channel downstream of a fuel-injection nozzle and transversely relative to the direction of flow and which is intended for heating the fuel/air mixture, wherein the heating element is made rotatable in such a way that, above a specific engine cooling-water temperature, it can be transferred from its transverse working position into a position of rest lying in the direction of flow.

2. Intake system according to claim 1, wherein in an internal-combustion engine with two inlet valves per cylinder, the heating element constitutes a prolongation of a partition wall extending between the inlet valves and projecting into the intake channel in its position of rest.

3. Intake system according to claim 1, wherein the heating element is equipped with a shaft which is mounted on one side in the wall of the intake channel and in which an electrical contact is provided.

4. Intake system according to claim 2, wherein the heating element is equipped with a shaft which is mounted on one side in the wall of the intake channel and in which an electrical contact is provided.

5. Intake system according to claim 3, wherein the shaft possesses, at a free end, a crank-like actuating lever on which an adjusting rod controllable as a function of the load and speed is articulated.

6. Intake system according to claim 4, wherein the shaft possesses, at a free end, a crank-like actuating lever on which an adjusting rod controllable as a function of the load and speed is articulated.

7. Intake system according to claim 1, wherein the heating capacity of the heating element is controlled as a function of the cooling-water temperature.

8. Intake system according to claim 2, wherein the heating capacity of the heating element is controlled as a function of the cooling-water temperature.

9. Intake system according to claim 3, wherein the heating capacity of the heating element is controlled as a function of the cooling-water temperature.

10. Intake system according to claim 5, wherein the heating capacity of the heating element is controlled as a function of the cooling-water temperature.

11. A method of operating an intake system for a mixture-compressing internal combustion engine, having an electrically heatable heating element of flat form which is arranged in the intake channel downstream of a fuel-injection nozzle and transversely relative to the direction of flow and which is intended for heating the fuel/air mixture, wherein the heating element is made rotatable in such a way that, above a specific engine cooling-water temperature, it can be transferred from its transverse working position into a position of rest lying in the direction of flow, said method including controlling the position of the heating element as a function of the engine cooling water temperature.

12. A method according to claim 11, said method including controlling the heating level of the heating element as a function of the angular position of the heating element.

* * * * *

UNITED STATES PATENT AND TRADEMARK OFFICE
CERTIFICATE OF CORRECTION

PATENT NO. : 5,007,402
DATED : April 16, 1991
INVENTOR(S) : Dieter Scherenberg

It is certified that error appears in the above-identified patent and that said Letters Patent is hereby corrected as shown below:

On the title page

Item [21] Appl. No.: 544,893

Signed and Sealed this

Eighteenth Day of August, 1992

Attest:

DOUGLAS B. COMER

Attesting Officer

Acting Commissioner of Patents and Trademarks